United States Patent [19]

Mabuchi

[11] 4,368,398

[45] Jan. 11, 1983

[54] SMALL ELECTRIC MOTOR WITH REINFORCED BRUSH HOLDER

[75] Inventor: Takaichi Mabuchi, Matsudo, Japan

[73] Assignee: Mabuchi Motor Co. Ltd., Japan

[21] Appl. No.: 119,131

[22] Filed: Feb. 6, 1980

[30] Foreign Application Priority Data

Feb. 19, 1979 [JP] Japan ............................ 54-20074[U]
Aug. 31, 1979 [JP] Japan ........................... 54-119934[U]

[51] Int. Cl.³ ........................................ H02K 13/00
[52] U.S. Cl. .................................. 310/248; 310/249; 310/244
[58] Field of Search .............. 310/219, 232, 239, 241, 310/242, 245, 246, 248, 249, 89, 71

[56] References Cited

U.S. PATENT DOCUMENTS

3,475,635 10/1969 Mabuchi ........................ 310/248 X
4,088,912 5/1978 Yoshida ......................... 310/248 X
4,228,376 10/1980 Mabuchi ........................ 310/248 X

FOREIGN PATENT DOCUMENTS

2747939 11/1978 Fed. Rep. of Germany ...... 310/248
2033168 5/1980 United Kingdom ............... 310/249

Primary Examiner—Mark O. Budd
Attorney, Agent, or Firm—McGlew and Tuttle

[57] ABSTRACT

A small electric motor having brushes comprising brush bases supported by brush supporting portions provided on a motor casing and bent portions which are formed by bending a part of each brush so that commutator slide portions of the brushes come in elastic contact directly with a commutator at a predetermined angle, and characterized in that rigidity reinforcing portions for giving rigidity to the bent portions are provided and/or auxiliary supporting portions for supporting the lower sides of the brush bases at the bent portions are provided on the brush supports.

2 Claims, 5 Drawing Figures

SMALL ELECTRIC MOTOR WITH REINFORCED BRUSH HOLDER

BACKGROUND OF THE INVENTION

1. Field of the Invention

This invention relates generally to a small electric motor, and more specifically to a small electric motor wherein rigidity reinforcing portions are provided for supplementing the rigidity of brushes on bent portions at which the brushes are bent to form brush bases and commutator slide portions, and auxiliary supporting portions are provided as necessary for supporting the lower sides of the bent portions so as to prevent the unwanted movement of the commutator slide portions to reduce the wear of the commutator due to friction and to extend the life of the motor.

2. Description of the Prior Art

The wear of commutator, which is one of the most important factors affecting the service life of a small electric motor, can be divided into two types; mechanical wear due to its frictional contact with brushes, and electrical wear due to sparks generated between the commutator and the brushes. The wear of the commutator becomes severe, particularly when the mechanical and electrical wear occurs simultaneously. As the commutator rotates, the brushes skip on the surface of the commutator due to the irregularities of the commutator surface or vibrations during rotation. This facilitates the generation of sparks, and therefore the wear of the commutator. Therefore, the commutator and the brushes must be kept in good contact at all times by pushing the brushes toward the commutator with an appropriate force.

In general, brushes 1 and 1' used in a small electric motor are made of strips of resilient and electrically conductive material, such as copper-beryllium alloy and brush bases 2 and 2' and commutator slides 3 and 3' are integrally formed by bending the brushes 1 and 1' at a predetermined angle, as shown in FIG. 1. Reference numerals 4 and 4' in FIG. 1 refer to terminal portions; 5 and 5' to fixing bent pieces and 6 and 6' to fixing holes. On a motor case cover 7 provided are brush supporting portions 8 and 8' and 9 and 9' for supporting the brushes 1 and 1'. Gaps between the brush supporting portions 8 and 8' and 9 and 9' form brush insert holes 10 and 10'. When mounting the brushes 1 and 1' on the motor case cover 7, the brushes 1 and 1' are inserted in the direction shown by arrows a and a' in FIG. 1, respectively. At this time, the terminal portions 4 and 4' are passed through terminal holes (not shown) provided inside the brush insert holes 10 and 10', and led out of the motor case cover 7 for external connection. Since the opposing gaps between the brush support portions 8 and 8' and 9 and 9' are determined in accordance with the thickness of the brush support portions 2 and 2', the brushes 1 and 1' are supported by the motor case cover 7 in a state where the brush bases 2 and 2' are firmly secured between the brush support portions 8 and 8' and 9 and 9'. The brushes 1 and 1' are more firmly secured to the motor case cover 7 by engaging fixing holes 6 and 6' on fixing bent pieces 5 and 5', which are formed by bending the brush bases 2 and 2', with projections 11 and 11' provided on the brush support portions 9 and 9' and staking the heads of the projections 11 and 11'. FIG. 2 is a plan view, taken from the direction shown by an arrow a in FIG. 1, illustrating the state where the brush 1 is supported by the motor case cover 7 and the commutator slide 3 is in elastic contact with the commutator. As shown in FIG. 1, the commutator slide 3 extends straightforwards in an unconstrained state, or in a state where the commutator slide 3 is not in contact with the commutator 12. When the commutator slide 3 is brought into contact with the commutator 12, however, the commutator slide 3 is bent to exert a pushing force by resiliency thereof onto the commutator 12. The pushing force can be adjusted to an optimum value by appropriately selecting the bending angle $\theta$ between the brush base 2 and the commutator slide 3 which is in an unconstrained state.

The rotation of the commutator, however, introduces friction between the commutator 12 and the commutator slide 3, and thereby causes a tangential force to the commutator slide 3 at the portion where it comes in contact with the commutator 12. In other words, when the commutator rotates in a direction shown by F in FIG. 2, the commutator slide 3 is brought into a state shown by a dotted line A in the figure due to a force directing toward the tip of the brush 1 (in the direction shown by T in the figure). On the other hand, when the commutator 12 rotates in a direction shown by an arrow R in the figure, the commutator slide 3 is bent more sharply and brought into a state shown by a dotted line B in the figure as a result of a force exerting in a direction to push up the commutator slide 3 (in a direction shown by C in the figure). In either case, when the degree of bending or extension of the commutator slide 3 exceeds a given limit, the commutator slide 3 is quickly restored to the original state, or in the state shown by a solid line in the figure. Thus, the commutator slide 3 repeats bending (or extension) and restoration to the original state, as described above, during the rotation of the commutator 12. When returning to its original state, the commutator slide 3 rapidly rubs the surface of the commutator 12, causing local mechanical wear due to abrasion on the surface of the commutator 12. The local wear of the commutator 12 induces sparks, leading to electrical wear. To solve this problem, it has been considered that the commutator slide in an unconstrained state is bent in advance so that the commutator slide 3 is substantially straightened when coming into contact with the commutator 12 to prevent the aforementioned repetation of bending (or extension) and restoration.

However, the brush material generally used in small electric motors is on the order of 0.08 mm in thickness, having low mechanical strength. As described in reference to FIG. 2, therefore, the rotation of the commutator 12 introduces a tension force in the direction shown by an arrow T in the figure, or a compression force in the direction shown by an arrow B in the figure to the commutator slide 3, resulting in vibration or rocking of the bent portion 13 between the brush base 2 and the commutator slide 3, or a change in the bending angle $\theta$ of the bent portion 13. In such a construction, therefore, the deformation of the brush as shown by a dotted line A or B in FIG. 2 has not been successfully prevented.

SUMMARY OF THE INVENTION

It is an object of this invention to provide a small electric motor wherein unwanted rocking of commutator slides of brushes is prevented to reduce frictional wear of a commutator and extend the service life of the commutator by reinforcing bent portions between the brush bases and the commutator slides with rigid reinforcing portions provided on the bent portions.

It is another object of this invention to provide a small electric motor wherein unwanted vibration or rocking of the commutator slides is prevented to reduce frictional wear of the commutator and extend the service life of the commutator by providing auxiliary supports for supporting the bent portions on brush supporting portions.

It is still another object of this invention to provide a small electric motor wherein unwanted vibration or rocking of the commutator slides is prevented to reduce frictional wear of the commutator and extend the service life of the commutator by using the brushes of such a construction that the commutator slides in an unconstrained state are bent in advance so that the commutator slides is kept essentially straightforward when coming in contact with the commutator.

DETAILED DESCRIPTION OF THE EMBODIMENTS

Figure 3:
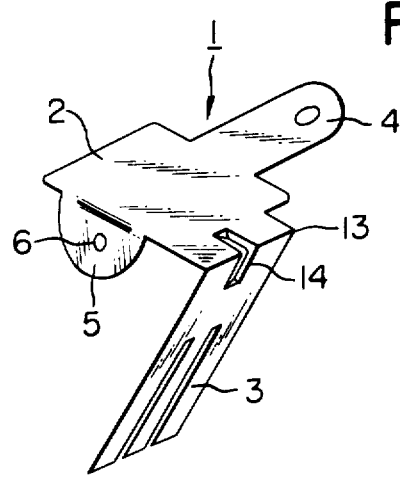
FIG. 3 is a perspective view of brushes used in a small electric motor embodying this invention.
Figure 4:
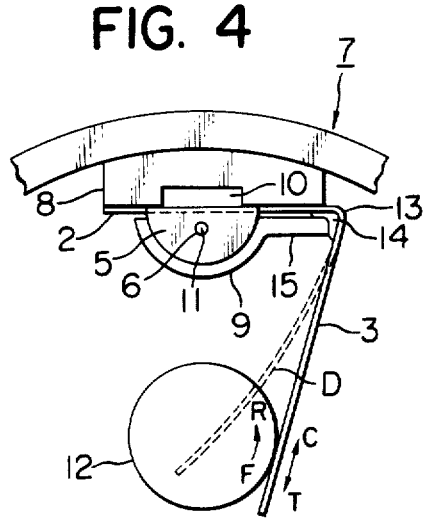
FIG. 4 is a plan view illustrating another embodiment of this invention.
Figure 5:
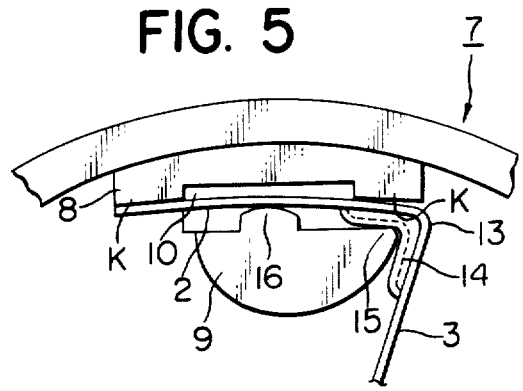
FIG. 5 is a plan view of still another embodiment of this invention.

In FIGS. 3 through 5 each illustrating embodiments of this invention, reference numeral 1 refers to a brush; 2 to a brush base; 3 to a commutator slide; 4 to a terminal portions; 5 to a fixing bent piece; 6 to a fixing hole; 7 to a motor case cover; 8 and 9 to brush supporting portions; 10 to a brush insert hole; 11 to a projection; 12 to a commutator; 13 to a bent portion; 14 to a rigid reinforcing portion; 15 to an auxiliary supporting portion, respectively.

As described with reference to FIG. 2, one of the causes of unwanted vibration or rocking of the commutator slide 3 is a change in the position of the bent portion 13. Consequently, this invention has such a construction that a reinforcing means is provided on the bent portion 13 so as to prevent the bending angle θ from being changed even when a force is exerted to the commutator slide 3 in a direction shown by an arrow C or T in FIG. 2 during the rotation of the commutator 12. That is, the brush 1 used in the small electric motor of this invention has a rigid reinforcing portion 14 on the bent portion 13, as shown in FIG. 3, to reinforce the bent portion 13 and provide rigidity to the brush 1. The rigid reinforcing portion 14 shown in the embodiment of FIG. 3 is a long bead formed by embossing the bent portion 13 in a direction perpendicular to the bending line. In manufacturing the brush 1, a long bead is formed in advance by embossing the brush material at the boundary portion between the brush base 2 and the commutator slide 3, and then the brush material is bent at the bent portion 13, with the bulged side of the bead facing inside, to form the brush 1 as shown in FIG. 3. The brush 1 thus formed can satisfactorily prevent the unwanted vibration or rocking of the commutator slide 3, as described with reference to FIG. 2, since the bent portion 13 is reinforced by the rigid reinforcing portion 14. In the embodiment shown in FIG. 3, one rigid reinforcing portion 14 is provided. However, it is needless to say that a plurality of the rigid reinforcing portions may be provided, or any construction that can provide equal rigidity to the brush base 2 (by bending the side edges, for example) may be used, instead of the embossed bead.

Furthermore, in order to more positively prevent the rocking of the commutator slide 3, an auxiliary supporting portion 15 as shown in FIG. 4 may be provided on the brush supporting portion 9 as necessary to support the reinforcing portion 14.

In view of the fact that a strip of thickness approximately 0.08 mm is usually used for the brush base 2, it is virtually impossible to precisely form the brush insert hole 10 so that the terminal portion 4 of the brush base 2 can be snugly forced into the brush insert hole 10. That is, the brush insert hole 10 is very apt to become larger than the thickness of the brush in practical forming operation, thus resulting in play of the terminal portion 4 and the brush base 2 inside the brush insert hole 10. Even in such a case, however, unwanted movement of the brush 1 can be prevented by providing the auxiliary supporting portion 15 to support the rigid reinforcing portion 14 provided on the bent portion 13.

Provision of the rigid reinforcing portion 14 and the auxiliary supporting portion 15, therefore, ensures the firm support of the bent portion 13 without unwanted rocking or movement of the bent portion 13 and prevents the commutator slide 3 from causing unwanted friction with the commutator 12 even during the high speed rotation of the commutator 12.

Figure 1:
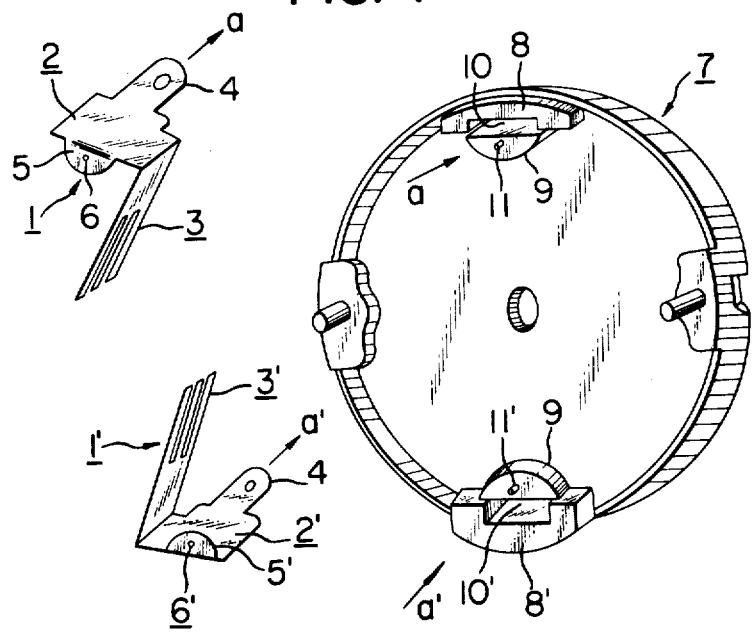
FIG. 1 is a perspective view illustrating the relationship of brushes and a motor case cover in an example of a conventional small electric motor.
Figure 2:
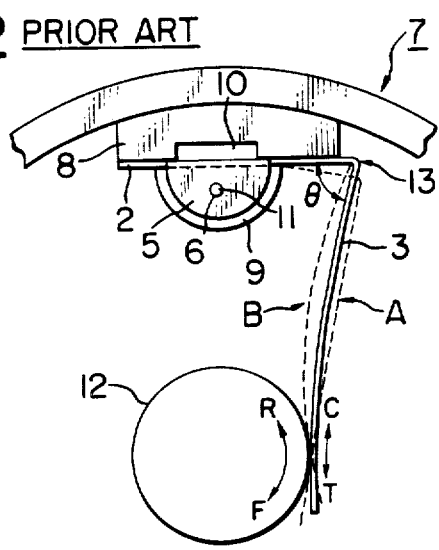
FIG. 2 is a plan view taken from the direction shown by an arrow a in FIG. 1 of a state where the brushes shown in FIG. 1 are fixed to the motor case cover and brought into contact with the commutator.

As described with reference to FIG. 2, the commutator slide 3 tends to be bent sharply, as shown in FIG. 2, when the rotation of the commutator 12 in a direction shown by an arrow F or R in FIG. 4 exerts a force to the commutator slide 3 in a direction shown by an arrow T or C in FIG. 2. In order to prevent the bending of the commutator slide 3, it is desired that the commutator slide 3 assumes a straight line as shown in FIG. 4 when the commutator slide 3 is brought into elastic contact with the commutator 12. To attain this, the commutator slide 3 in an unconstrained state is bent an advance as shown by a dotted line D in FIG. 4 to such an extent that the commutator slide 3 assumes essentially a straight line when it is in elastic contact with the commutator 12.

FIG. 5 shows another embodiment of this invention. In this embodiment, the central part of the brush base 2 is supported by a central projection 16 provided on the brush supporting portion 9, both sides of the brush base 2 are supported by two points K and K of the brush supporting portion 8. That is, this is an embodiment where the brush base 2 is subjected to a bending force and resiliently supported by the so-called three-point support. Even in such a case where the brush 1 is supported by the three-point support, the same effect as in the embodiments shown in FIGS. 3 and 4 can be achieved by supporting the brush 1 as shown in FIG. 5 by providing the rigid reinforcing portion 14 on the bent portion 13 between the brush base 2 and the commutator slide portion 3, or extending the brush supporting portion 9 to form the auxiliary supporting portion 15 for supporting the rigid reinforcing portion 14 as necessary.

As described in the foregoing, this invention makes it possible to reduce unwanted friction between the commutator slide 3 and the commutator 12 of a small electric motor due to the rocking of the commutator slide 3 even during the high speed rotation of the commutator 12, and to reduce local wear of the commutator 12 to improve the service life thereof by forming the rigid reinforcing portion on the brush base bent portion 13, supporting the brush bent portion 13 by the auxiliary supporting portion 15 from the bottom as necessary, or bending the commutator slide 3 in an unconstrained state so that the commutator slide 3 assumes a straight line when it is brought into elastic contact with the commutator 12.

What is claimed is:

1. A small electric motor having a motor case cover, a commutator and a brushgear, said motor comprising brushes made of an electrically conductive and resilient material, each of said brushes having bent portions bent at a predetermined angle to form a brush base and a commutator slide with said commutator slide extending from said respective bent portion into resilient contact with the commutator of said motor, and brush supporting portions provided on the motor case cover for supporting said brush bases in such a manner that said commutator slides are brought into resilient contact wih said commutator of said motor, said brush supporting portions each including a first section for supporting the central part of the brush base and second sections for supporting both sides of the brush base and characterized in that said commutator slide, in an unconstrained state, is bent in advance toward the commutator side so that said commutator slide assumes a straight line when said commutator slide is brought into resilient contact with said commutator and rigid reinforcing portions are provided on the bent portions to provide rigidity to said bent portions.

2. A small electric motor as set forth in claim 1 wherein auxiliary supporting portions are provided on the brush supporting portions for supporting the lower sides of the brush base bent portions.